United States Patent [19]

Strong et al.

[11] Patent Number: 5,078,966
[45] Date of Patent: Jan. 7, 1992

[54] CARBOHYDRAZIDE TO PREVENT HYDROGEN BLISTERING AND CORROSION OF METAL SURFACES IN CONTACT WITH REFINERY OVERHEAD CONDENSATES

[75] Inventors: Russell C. Strong, Richmond; Veronica K. Majestic, Stafford, both of Tex.

[73] Assignee: Nalco Chemical Company, Naperville, Ill.

[21] Appl. No.: 567,208

[22] Filed: Aug. 14, 1990

[51] Int. Cl.$^5$ ............................................. C23F 11/00
[52] U.S. Cl. ........................................ 422/7; 210/698; 252/390; 252/392; 252/394; 422/16

[58] Field of Search ................... 422/16, 7; 210/698; 252/390, 392, 394

[56] References Cited

U.S. PATENT DOCUMENTS 2,780,583  2/1957  Skei et al. ........................ 422/7 X
4,269,717  5/1981  Slovinsky ........................ 422/16 X Primary Examiner—Jill Johnston
Attorney, Agent, or Firm—John G. Premo; Robert A. Miller

[57] ABSTRACT

Carbohydrazide is an effective material for preventing hydrogen blistering and corrosion in the refinery overhead condensate systems of Fluid Catalytic Cracking Units.

1 Claim, 4 Drawing Sheets

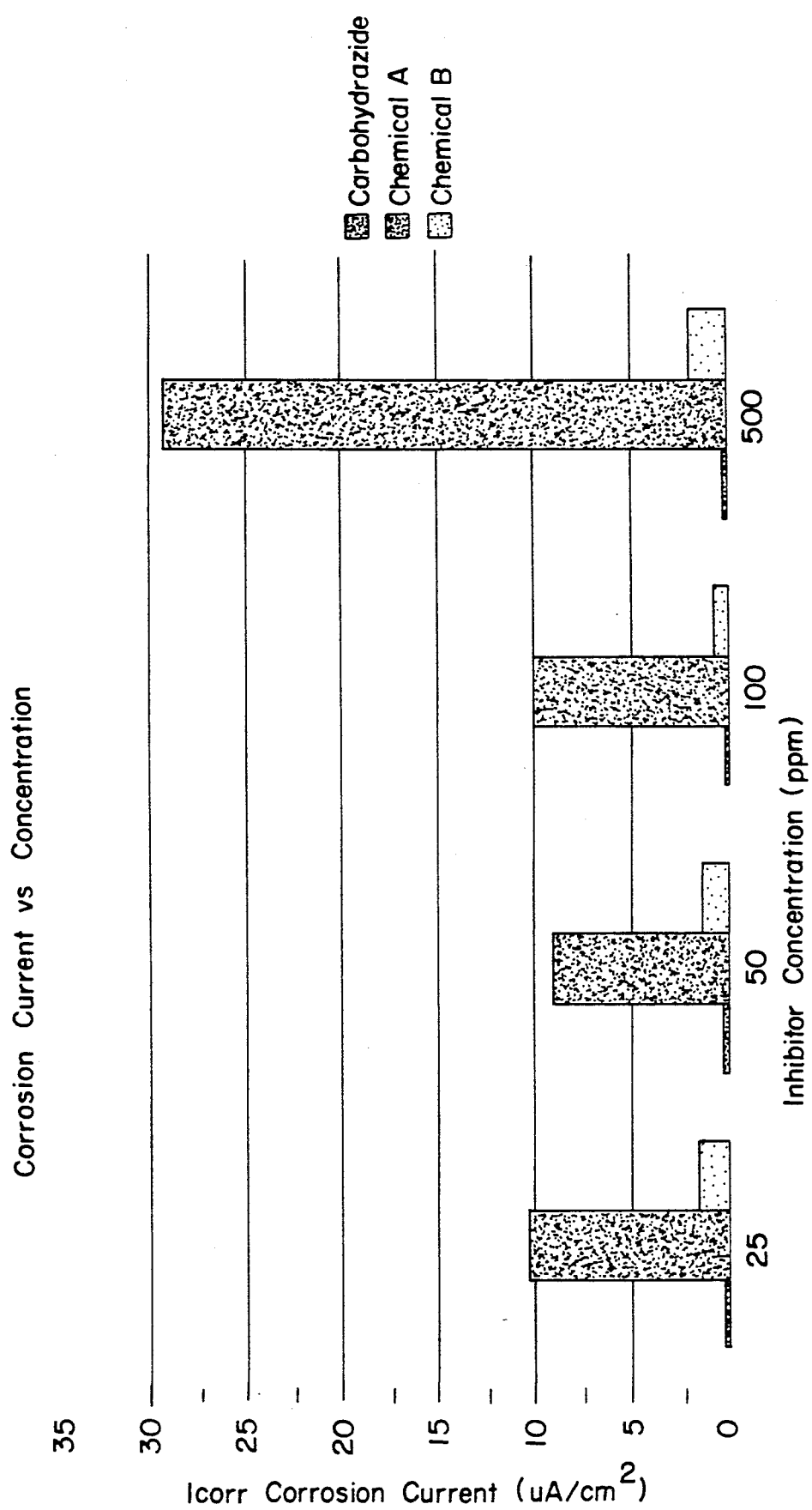

CARBOHYDRAZIDE TO PREVENT HYDROGEN BLISTERING AND CORROSION OF METAL SURFACES IN CONTACT WITH REFINERY OVERHEAD CONDENSATES

INTRODUCTION

Hydrogen blistering in fluid catalytic cracking units and their gas plants began to occur with the advent of synthetic catalysts. The naturally occurring nitrogen compounds in the crude cracked to afford ammonia and cyanides. In many instances sulfur compounds are cracked and release hydrogen sulfide.

The most severe areas for blistering and weld cracking are in compressor aftercoolers, high pressure knockout pot and the deethanizer. Some blistering and weld cracking may occur in the remainder of the equipment shown but there is much less occurrence and usually less severe blisters in size and depth. Generally the problems of corrosion and hydrogen blistering occur in the vapor phase of the fluid catalytic cracking units which for the purposes of this invention are referred to herein as overhead condensates which includes those associated portions of the units described.

It is common practice to water wash these systems. In addition water is present from steam stripping, thus producing a wet environment which contains hydrogen sulfide, ammonia and hydrogen cyanide. This environment has been shown to produce hydrogen blistering and weld cracking. In these systems the ratio of hydrogen sulfide to ammonia controls the pH of the system. At pHs between 7.8 to 8, little corrosion and hydrogen blistering occur. At pHs outside of these ranges, hydrogen penetration increases.

For a more complete description of the problems described above and fluid catalytic cracking units, reference may be had to the following articles which are incorporated herein by reference:

1. "Polysulfide stops FCCU Corrosion," by Ernest F. Ehmke, Tosco Corp., Martinez, Calif., *Hydrocarbon Processing*, July 1981, pages 149–155.
2. "Reduce FCC Corrosion," by H. B. Walker, Betz Process Chemicals, Inc., The Woodlands, Tex., *Hydrocarbon Processing*, January 1984, pages 80–84.

In the last referenced article the author indicates that a variety of approaches have been used in an effort to prevent both corrosion and hydrogen blistering in fluid cracking units. Such proposed solutions have included water washing, polysulfide addition, as well as the use of organic filming inhibitors. One of the most interesting observations made by the author in this paper relates to the fact that corrosion inhibitors do not prevent hydrogen blistering, specifically the author states:

"Many general corrosion inhibitors and inhibiting processes that limit overall corrosion are not effective in controlling hydrogen blistering because they do not prevent diffusion of hydrogen into the steel."

If it were possible to provide a chemical which when added to the overhead of FCC units would prevent both corrosion and hydrogen blistering in the vapor phase portions of these units, a valuable contribution to the art of petroleum refining would be afforded.

THE DRAWINGS

Figure 3:
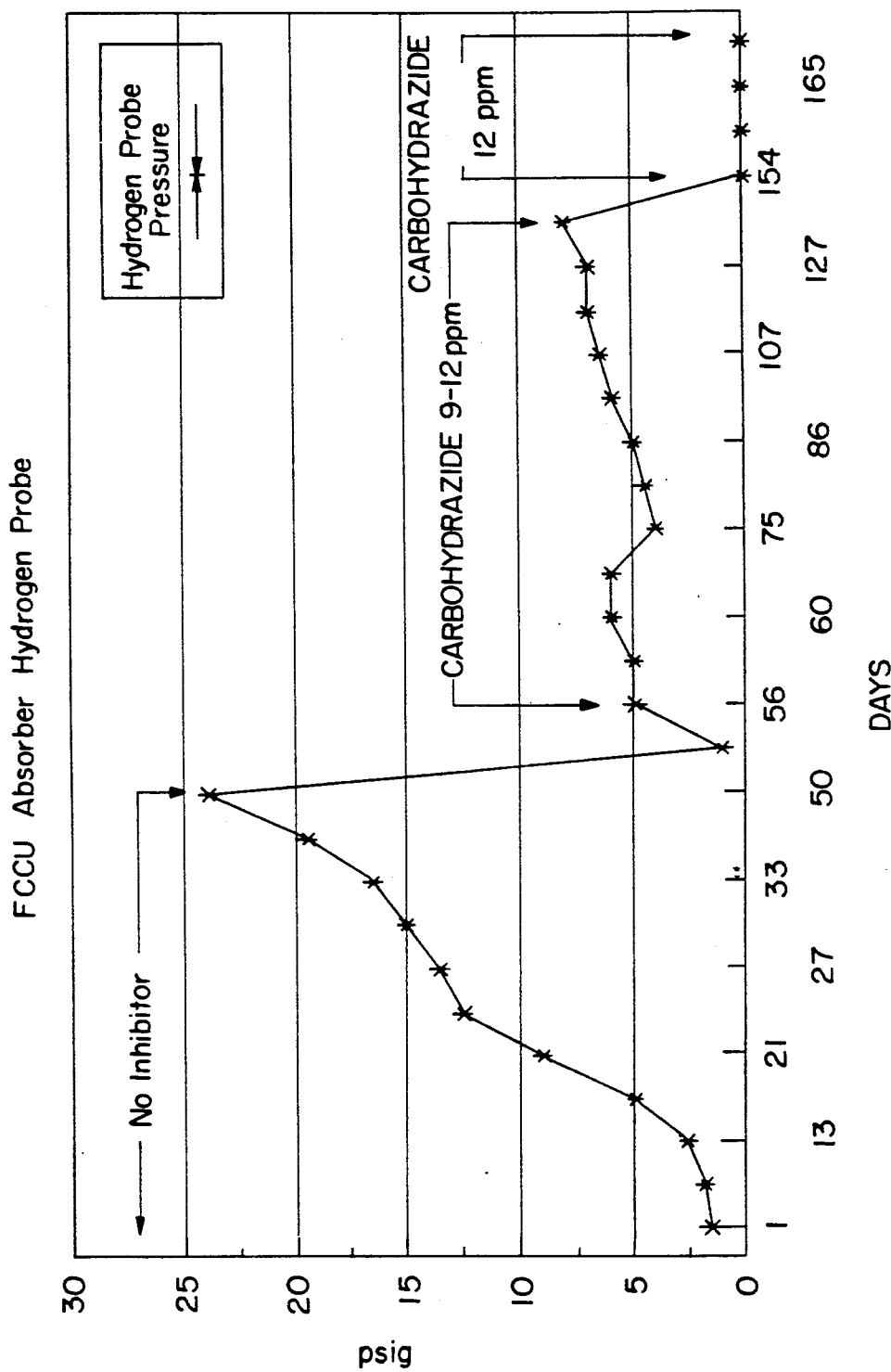

FIG. 3 plots the results of a field test using the inhibitor of the invention.

FIG. 4 shows the efficiency of the inhibitor of the invention in preventing corrosion.

THE INVENTION

In accordance with the invention there is provided a method for the prevention of hydrogen blistering of ferrous metal surfaces and the prevention of corrosion of ferrous and other metal surfaces in contact with refinery overhead condensates which comprises treating the condensates with at least 0.5 parts per million (ppm) of carbohydrazide. The amount of carbohydrazide used to treat these overheads may vary from as little as 0.5 ppm, up to as much as 100–200 ppm. A typical dosage would be within the range of about 2–25 ppm fed to the condensates at a point where they are beginning to form in the units. A preferred feed point for the carbohydrazide is in the overhead lines and in absorbers which are commonly found associated with fluid cracking units.

The carbohydrazide in addition to providing protection against hydrogen blistering, tends to afford corrosion protection. It should be understood, however, that the main advantage of using carbohydrazide is its unexpected ability to prevent hydrogen blistering of ferrous metal surfaces in contact with corrosive overhead refinery condensate streams.

When the carbohydrazide enters the systems they are at temperatures, ranging between 50° to 250° F. Over a period of time at these temperatures the carbohydrazide decomposes to form hydrazine. The hydrazine is in equilibrium with the carbohydrazide. It may be therefore that the actual hydrogen blistering is prevented by either the hydrazine or an equilibrium composition composed of carbohydrazide and hydrazine. In any event, for the purposes of this invention such breakdown, or any equilibrium conditions that might form within the units being treated, are considered to be covered by the concept of feeding carbohydrazide into the overhead systems to prevent hydrogen blistering and corrosion. Hydrazine is a highly toxic material and is not susceptible to handling by untrained personnel. Therefore, the feeding of hydrazine directly into the units thus described would not be feasible as a practical matter in the operation of refinery equipment.

EVALUATION OF THE INVENTION

Laboratory Test Work

The experimental program was to quantitatively determine the effect that carbohydrazide and various organic corrosion inhibitors have on hydrogen absorption and in preventing corrosion in FCC units.

Determination of an inhibitor's ability to reduce hydrogen absorption requires the simultaneous measurement of two quantities. These two quantities are the corrosion rate, using electrochemical linear polarization, and the atomic hydrogen flux. Hydrogen flux is measured in a hydrogen permeation experiment in which hydrogen is generated on one side of a steel membrane at a fixed rate by an electrochemical reaction and collected on the opposite side.

Hydrogen blistering and corrosion can be readily determined using the technique described in the article, "On Hydrogen Damage and the Electrical Properties of Interfaces," by J. O'M. Bockris, *Stress Corrosion Cracking and Hydrogen Embrittlement of Iron Based Alloys*, NACE, R. W. Staehle, et al, editors, page 286, 1977.

The principle of this method is summarized by the author in the following words:

"The basic concept is that of a bi-electrode on one side of which hydrogen is deposited. The majority of the hydrogen evolves into the solution and escapes; and a small fraction passes into the metal. On the other side of the membrane, a separate solution, electrically isolated from the first, exists. Separate electrical circuitry makes the side of the membrane at which hydrogen is not evolved an anode. Here, the hydrogen which enters the membrane on the input side is anodically dissolved out. The anodic current density at steady state is a measure of the steady state throughput situation for the permeation of hydrogen through the metal."

In addition to measuring hydrogen permeation, the procedure and apparatus described in the Bockris article may be used to evaluate corrosion. The specific technique used to evaluate the invention utilizes a potentiostat which applied an oxidizing potential at 200 mV vs SCE (saturated calomel electrode) to the collecting side of the membrane. At this potential the diffusing hydrogen atoms that reaches the collecting side of the membrane are oxidized to protons. The membrane was A516-70 steel with a thin coating of palladium on the collecting side to enhance hydrogen oxidation. The steel was allowed to corrode for 15 hours prior to the permeation measurement in order to allow the system to come to a corrosion equilibrium. The corrosion current was then measured simultaneously with the hydrogen permeation current to determine the background current steady state condition. The background current is the permeation current that results from corrosion alone. The steel is then galvanostatically charged at two different current densities (50 and 125 uA/cm$^2$) and the resultant permeation current recorded. Comparison of these values with those obtained using a different environmental condition (different inhibitors, or no inhibitors) provides the relative abilities of the inhibitor compounds to reduce hydrogen permeation.

The test environment consisted of a pH 9.5 solution of 1 percent $NH_4S_2$ and 0.68 percent KCN with $H_2S$ gas addition.

| Compositions Tested | |
|---|---|
| Composition | Make-Up |
| Carbohydrazide | 6% aqueous solution |
| A | Polyamine bottoms-acetic acid salt 35% in $H_2O$. |
| B | The quaternary ammonium salt polymer formed by the reaction of epichlorohydrin and dimethylamine solution. See Panzer U.S. Pat. No. 3,725,312. |

Figure 1:
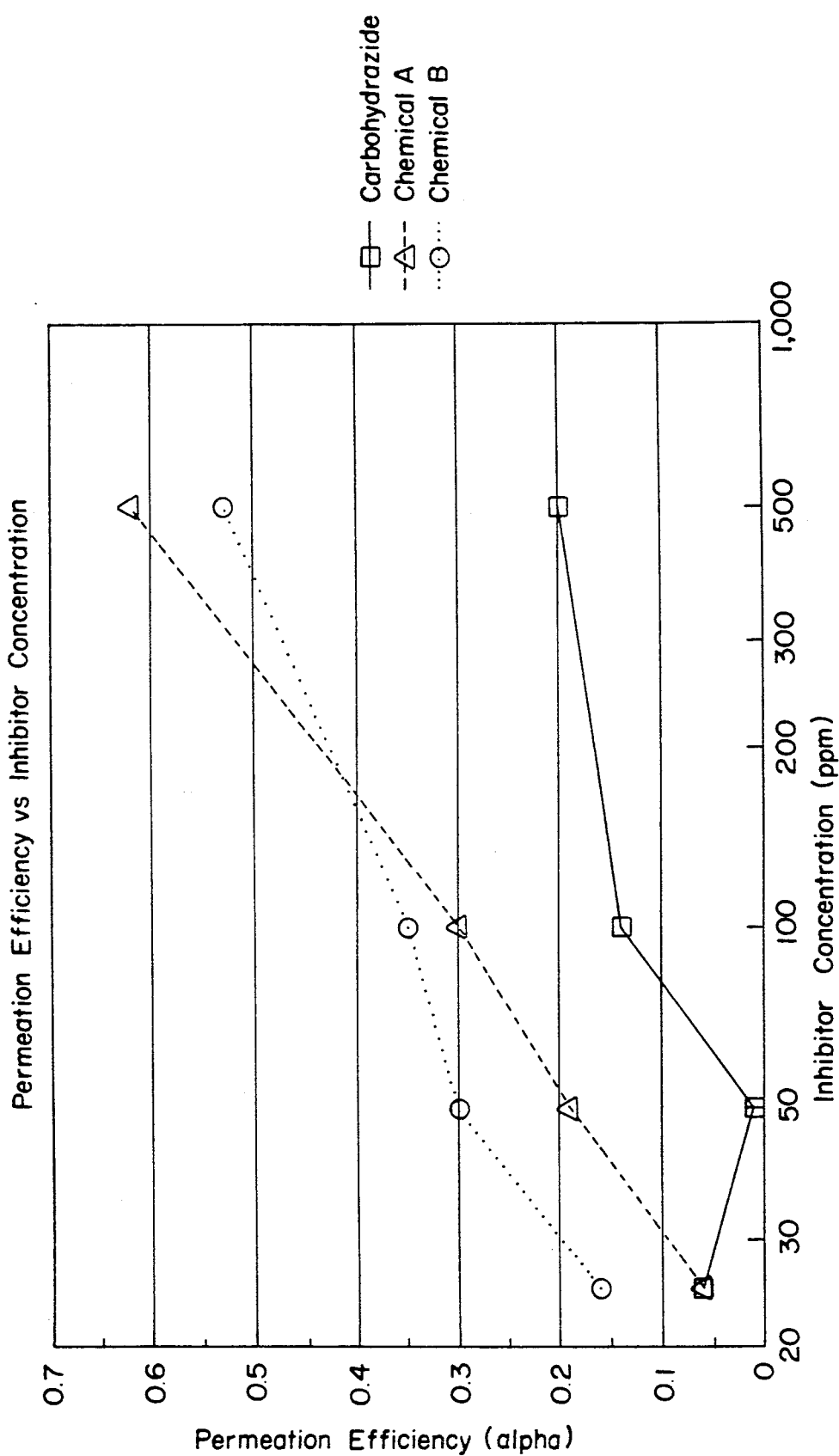
FIG. 1 shows the permeation efficiency of the inhibitors at various concentrations.

Using the test method described above, the hydrogen permeation efficiency of these compositions versus carbohydrazide are set forth in FIG. 1.

Figure 2:
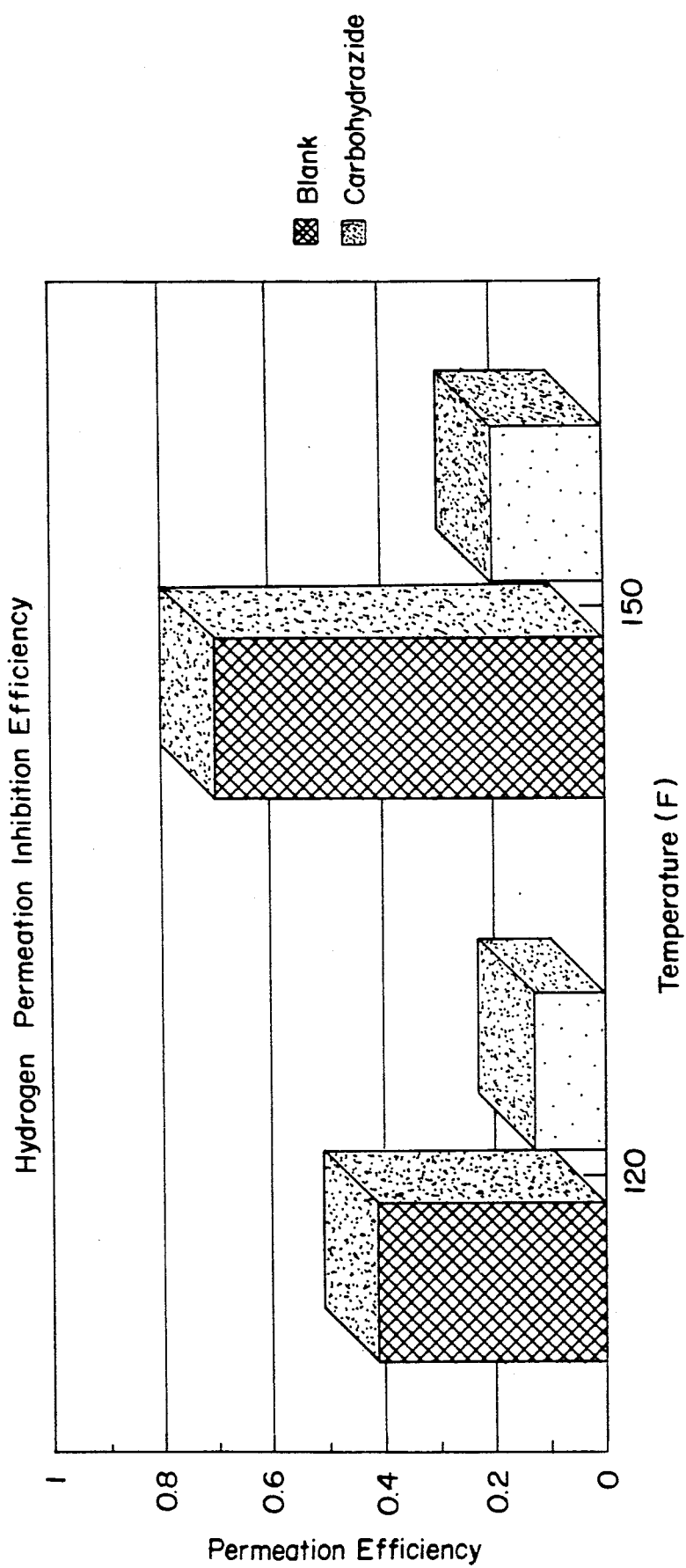
FIG. 2 shows the hydrogen permeation inhibitor efficiency of the inhibitor of the invention.

The hydrogen permeation inhibition efficiency of carbohydrazide versus no inhibitor is set forth in FIG. 2.

FIG. 3 is based upon an extended field test in an FCC unit using carbohydrazide. The results of the test are based upon hydrogen probe data which is described as being an accurate measurement of hydrogen absorption inhibition. See particularly the article entitled, "Polysulfide Stops FCCU Corrosion," by Ernest F. Ehmke, previously cited. The inhibitor was fed to the fractionator overhead just prior to its entry into an absorber column. The hydrogen probe was placed following the system coalescer.

FIG. 4 illustrates the efficiency of carbohydrazide as a corrosion inhibitor as compared to inhibitors A and B.

Based on the above, it is obvious the invention provides a unique method for preventing hydrogen blistering as well as preventing corrosion in FCC units.

We claim:

1. A method for the prevention of hydrogen blistering of ferrous metal and the corrosion of metal surfaces of Fluid Catalytic Cracking Units in contact with refinery overhead condensates produced by a Fluid Catalytic Cracking reactor, said overhead condensate being in fractionation and compression systems downstream from the Fluid Catalytic Cracking reactor, the method comprising the step of adding at least 0.5 parts per million of carbohydrazide to the overhead condensate.

* * * * *